Patented Feb. 22, 1938

2,108,912

UNITED STATES PATENT OFFICE 2,108,912

DEFOAMING METHOD AND MEANS

Harland H. Young, Jr., Chicago, Ill., assignor to Industrial Patents Corporation, Chicago, Ill., a corporation of Delaware No Drawing. Application July 9, 1935, Serial No. 30,577

5 Claims. (Cl. 252—6)

This invention relates to the prevention of foaming or frothing in the preparation or use of solutions, suspensions or mixtures of various kinds which have a tendency to produce foam or froth.

One of the objects of this invention is to provide an improved defoamer which may be added to such material as glue to prevent foaming when the glue is used as it normally is used in aqueous solutions.

Other objects of the invention will be apparent from the description and claims which follow.

It is known that water insoluble metallic soaps are more or less effective as defoamers when the metallic soap is dissolved in an organic solvent such as paraffin or tallow and a dispersing agent such as sulphonated oil or sulphonated tallow is added. It is also known that some defoaming effect is secured by the use of a water insoluble metallic soap dissolved in an organic solvent such as pine oil.

The present invention is directed to an unusually effective defoamer which is inexpensive to prepare. The defoamer of the present invention is prepared by first dissolving aluminum stearate in free stearic acid. The solution is subsequently diluted with paraffin and the resulting wax is then emulsified with the glue or other mixture from which it is desired to remove the foaming characteristic.

An example of a suitable formula is as follows:

Fifteen parts of aluminum stearate are dissolved in 90 to 100 parts of stearic acid and to this solution are added 90 pounds of paraffin wax and 100 pounds of Japan wax. This wax is then made up into the defoamer as follows: 45 pounds of wax are dissolved in 135 pounds of tallow, 30 pounds of castor oil, and 30 pounds of Turkey red oil. This solution is then emulsified with 30 to 50 pounds of water in which form it is ready for use.

Although trivalent aluminum is known to form only the mono- and di-stearate and not the tri-stearate, I find that by using a quantity of stearic acid which approximates the quantity necessary to convert a di-stearate to a tri-stearate, the resulting defoamer is unusually effective and not only has greatly increased defoaming power but also inhibits separation of a scum of aluminum stearate on the surface of glue to which the defoamer has been added.

As used in this specification and in the claims, the term "solution" will be understood in its broad sense as including true solutions, suspensoids, and colloids.

I claim:

1. A defoamed product consisting of a mixture of a foamable substance capable of aqueous solution, and a defoamer comprising aluminum stearate, stearic acid and wax dispersed in the foamable substance.

2. A defoamed product comprising a mixture of a foamable substance capable of aqueous solution, and a defoamer comprising aluminum stearate and stearic acid.

3. A defoamer comprising wax, aluminum stearate and stearic acid.

4. The process of preparing a defoaming agent which comprises dissolving aluminum stearate in stearic acid and thereafter diluting the solution with paraffin wax.

5. The process of preparing a defoaming agent which comprises dissolving aluminum stearate in stearic acid and thereafter diluting the solution with wax.

HARLAND H. YOUNG, Jr.